(12) United States Patent
van Wonderen et al.

(10) Patent No.: US 6,883,650 B2
(45) Date of Patent: Apr. 26, 2005

(54) ADJUSTABLE SHOCK ABSORBER

(75) Inventors: Simon van Wonderen, Toronto (CA); Julian Harbu, North York (CA)

(73) Assignee: ArvinMeritor Technology, LLC., Troy, MI (US)

( * ) Notice: Subject to any disclaimer, the term of this patent is extended or adjusted under 35 U.S.C. 154(b) by 0 days.

(21) Appl. No.: 10/295,116

(22) Filed: Nov. 15, 2002

(65) Prior Publication Data
US 2004/0094376 A1 May 20, 2004

(51) Int. Cl.⁷ .................................................. F16F 9/48
(52) U.S. Cl. ...................................... 188/287; 188/285
(58) Field of Search ........................ 188/85, 286, 787

(56) References Cited

U.S. PATENT DOCUMENTS

| | | | | | |
|---|---|---|---|---|---|
| 889,619 | A | * | 6/1908 | Kilgour | 188/287 |
| 984,377 | A | * | 2/1911 | Kilgore | 188/287 |
| 2,846,029 | A | * | 8/1958 | Cawley | 188/287 |
| 3,024,874 | A | * | 3/1962 | De Koning et al. | 188/286 |
| 3,510,117 | A | * | 5/1970 | Scholin et al. | 267/126 |
| 3,645,365 | A | * | 2/1972 | Domek | 188/285 |
| 3,693,767 | A | * | 9/1972 | Johnson | 188/285 |
| 3,782,710 | A | * | 1/1974 | Selke et al. | 267/118 |
| 3,840,097 | A | * | 10/1974 | Holley | 188/287 |
| 3,843,107 | A | * | 10/1974 | Atkins | 267/64.15 |
| 3,896,908 | A | * | 7/1975 | Petrak | 188/280 |
| 4,059,175 | A | * | 11/1977 | Dressell et al. | 188/285 |
| 4,151,784 | A | * | 5/1979 | Fussangel | 188/285 |
| 4,164,274 | A | * | 8/1979 | Schupner | 188/285 |
| 4,174,098 | A | * | 11/1979 | Baker et al. | 267/221 |
| 4,465,166 | A | * | 8/1984 | Moore | 188/278 |
| 4,702,355 | A | * | 10/1987 | Heideman | 188/285 |
| 5,050,712 | A | | 9/1991 | Heideman | |
| 5,076,451 | A | * | 12/1991 | Conley et al. | 213/43 |
| 5,464,079 | A | | 11/1995 | Lohberg et al. | |
| 5,988,330 | A | | 11/1999 | Morris | |
| 6,026,939 | A | | 2/2000 | Girvin et al. | |
| 6,112,868 | A | | 9/2000 | Graham et al. | |
| 6,164,424 | A | | 12/2000 | Girvin et al. | |
| 6,244,398 | B1 | | 6/2001 | Girvin et al. | |
| 6,296,092 | B1 | | 10/2001 | Marking et al. | |
| 6,390,257 | B1 | | 5/2002 | Naples | |

* cited by examiner

Primary Examiner—Robert A. Siconolfi
(74) Attorney, Agent, or Firm—Carlson, Gaskey & Olds (57) ABSTRACT

A shock absorber includes a body having an outer cylinder which rotates relative to an inner cylinder to provide an adjustable damping force through fluid bypass. A plurality of ports are formed through the inner cylinder to provide the fluid bypass when a passageway within an inner surface of the outer cylinder is aligned therewith. Predetermined patterns of ports selectively adjust the dampening force of the shock absorber. When the passageway is rotated out of alignment with all the ports, no adjustment to the dampening force results as the inner surface of the outer cylinder seals the outer surface of the inner cylinder. When the passageway is rotated to be aligned with a pattern of the ports, the peak damping force is reduced during a longitudinal bypass zone of the stroke as defined by the port pattern. By locating a check valve within the passageway, bypass fluid flow will only occur in one direction.

15 Claims, 8 Drawing Sheets

ADJUSTABLE SHOCK ABSORBER

BACKGROUND OF THE INVENTION

The present invention relates to a device and method for adjusting damping in a vehicle shock absorber.

Vehicles utilize shock absorbers to dampen vibrations and shocks experienced by the vehicle. Variations in payload and ground conditions can affect vehicle control and handling. Having the ability to selectively adjust the damping force in a shock absorber is desirable to improve vehicle control and handling in response to these variables. Some shock absorbers include position sensing technology and damping adjustment that permit a vehicle operator to selectively change damping to a desired level.

Current adjustment systems rely on external components or adjuster modules to provide adjustment. Other conventional systems require numerous rather delicate parts for operation. Utilizing additional and/or numerous components significantly increases cost and assembly time. Thus, the adjustment feature is not typically incorporated on most vehicles.

Accordingly, it is desirable to provide a shock absorber which can be easily adjusted by a vehicle operator to control damping levels. The adjustment mechanism should also be cost effective in addition to overcoming the above referenced deficiencies.

SUMMARY OF THE INVENTION

The shock absorber according to the present invention provides a body having an outer cylinder rotatable relative to an inner cylinder. A plurality of ports are formed through the inner cylinder to provide a fluid bypass when a passageway within an inner surface of the outer cylinder is aligned therewith. Rotation of the outer cylinder allows the passageway to be selectively aligned with predetermined patterns of ports to selectively adjust the dampening force of the shock absorber.

The damping force of the shock absorber is selectively adjusted by the control of bypass fluid flow through predetermined port patterns and passageways as actuated by a vehicle operator. The rotation of the outer cylinder is accomplished by any of various types of actuation methods.

When the passageway is rotated out of alignment with all the ports, no adjustment to the dampening force results as the inner surface of the outer cylinder seals the outer surface of the inner cylinder. The shock absorber thereby performs in a conventional manner. When the passageway is rotated to be aligned with a pattern of the ports, the peak damping force is reduced during a longitudinal portion of the stroke. Various port patterns, port quantities, longitudinal port positions, port spans, and passageway selection provides a multiple of damping force reductions along a multiple of spans and longitudinal locations for longitudinal portions of the piston stroke.

By locating a check valve within the passageway, the damping force will be reduced from the peak damping force only during extension or compression depending upon the check valve orientation. Moreover, the check valve may be located at predetermined longitudinal locations to effect particular port patterns.

Another shock absorber according to the present invention provides an outer cylinder divided into two separate and independently rotatable outer cylinder portions. Each outer portion includes one or more passageways such that a single shock absorber will operate as a series of independently adjustable shock absorbers.

The present invention therefore provides a cost effective, relatively uncomplicated, shock absorber which can be easily adjusted by a vehicle operator to control damping levels.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
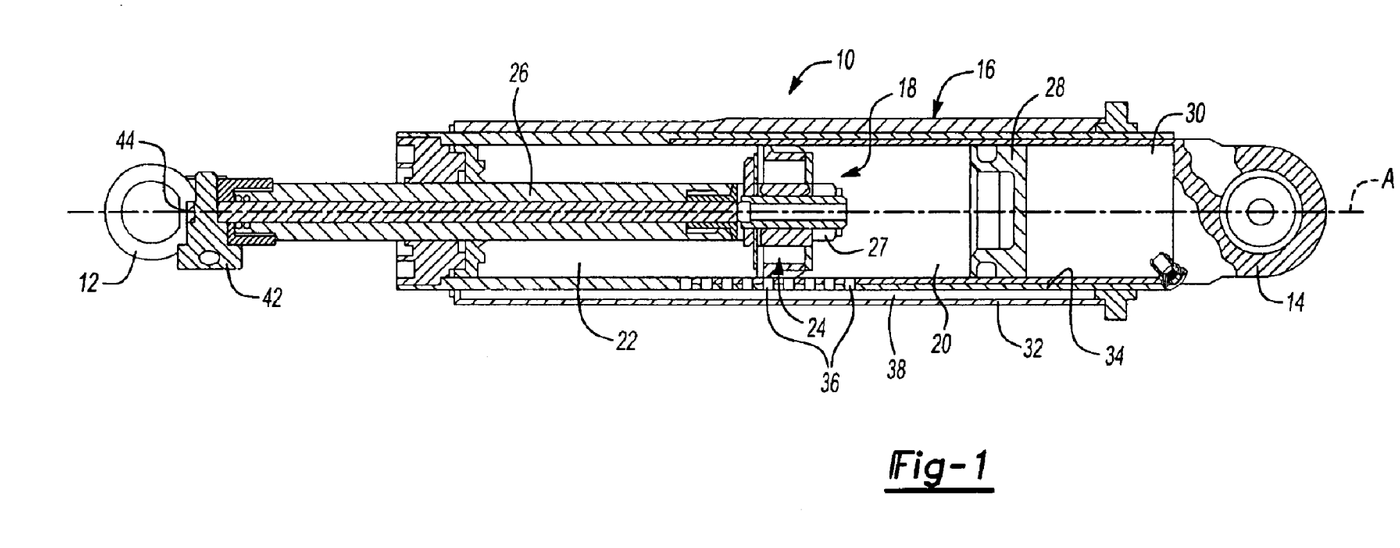
FIG. 1 is a longitudinal cross-sectional view of a monotube shock absorber.

FIG. 1 illustrates a general perspective view a general sectional view of a monotube shock absorber 10. It should be understood that other shock absorbers and other damping devices unrelated to shock absorbers will benefit from the present invention.

The shock absorber 10 defines a longitudinal axis A and is connected between a suspension and a vehicle body by upper 12 and lower 14 ends. The absorber 10 includes a body 16 defining a cavity 18 that is filled with fluid. Any type of known fluid can be used, including hydraulic fluid or gas either of which could be compressible or incompressible, for example.

A piston 24 is disposed within the cavity 18 and separates compression 20 and rebound 22 fluid chambers from one another. Fluid is sealed within the cavity 18, as is known in the art, and is compressed by the piston 24 to dampen vibrations. A rod 26 is secured to the piston 24 typically by a nut 27 to transmit the input received from the upper end 12 to move the piston 24 within the cavity 18. The piston 24 typically includes numerous valves and passages that controls the flow of fluid between the compression 20 and rebound 22 chambers to define the damping characteristics of the absorber 10 as the piston 24 moves longitudinally in the cavity 18. Multiple valves and passages within piston 24 will benefit from the present invention.

A floating piston 28 is arranged in the cavity 18 to separate the compression chamber 20 from a gas chamber 30. The floating piston 28 moves within the cavity 18 to accommodate the additional volume of the rod 26 during the compression and extension strokes.

Figure 2A:
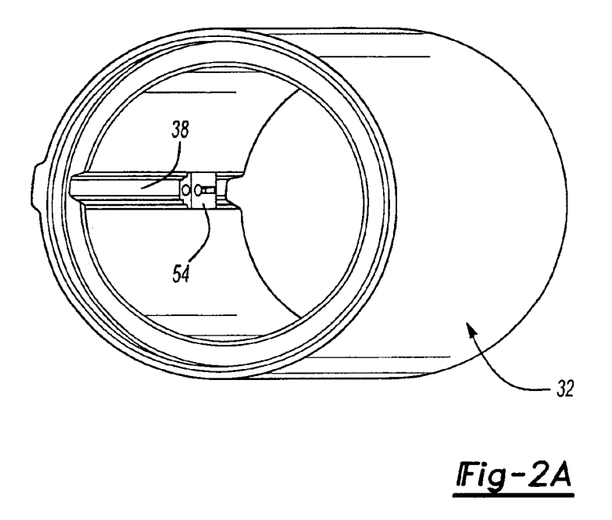
FIG. 2A is a perspective view of the outer cylinder of the monotube shock absorber of FIG. 1.
Figure 2B:
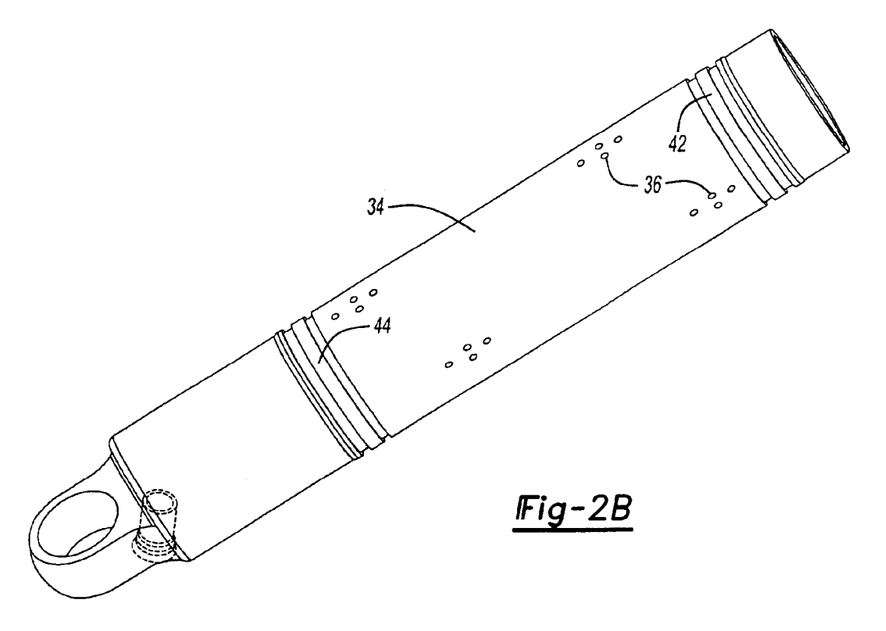
FIG. 2B is a perspective view of the inner cylinder of the monotube shock absorber of FIG. 1.

The shock absorber body 16 preferably includes an outer cylinder 32 (FIG. 2A) and an inner cylinder 34 (FIG. 2B). It should be understood that the term "cylinder" is to be construed broadly and should not be limited to just a tube. The outer cylinder 32 forms an outer surface of the shock absorber 10 and the inner cylinder 34 forms the inner surface of the shock absorber 10. A plurality of ports 36 are preferably formed through the inner cylinder 32 to provide a fluid bypass when a passageway 38 (FIG. 2) within an inner surface of the outer cylinder 32 is aligned therewith. It should be understood that the term "port" is to be construed broadly to include various shapes including non-round and slot like shapes. It should be understood that the one or mote passageways will benefit from the present invention.

Figure 3:
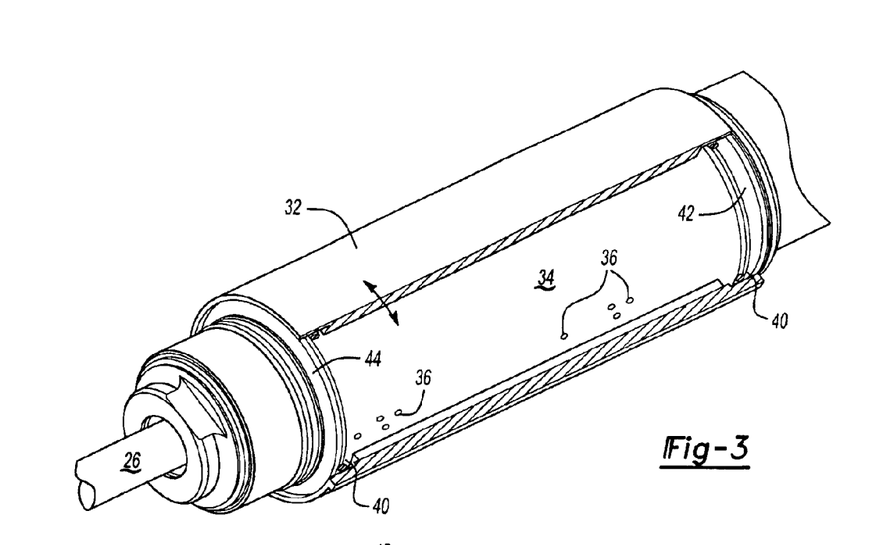
FIG. 3 is a general partial cross-sectional view of a monotube shock absorber.

Referring to FIG. 3, the outer cylinder 32 is mounted upon seals 40 such that the outer cylinder is rotatable relative the inner cylinder 34. The seals 40 are preferably mounted at each longitudinal end of the outer cylinder 32 for engagement with circumferential grooves 42, 44 mounted in the inner and outer cylinders 32, 34 respectively. Rotation of the outer cylinder 32 allows the passageway 38 (FIG. 2) to be selectively aligned with predetermined patterns of ports 36 to selectively adjust the dampening force of the shock absorber 10.

Figure 4:
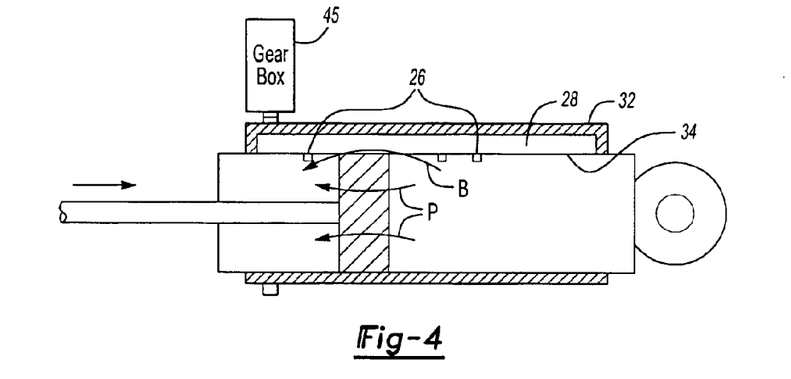
FIG. 4 is a general schematic view of a monotube shock absorber and pistons showing the fluid flow paths.

Referring to FIG. 4, as vibrations are dampened, fluid flows in a restricted manner through the piston from the compression 20 and rebound 22 chambers and/or vice versa through numerous valves and passages within the piston 24 as schematically represented by arrow P. Fluid flow can be bi-directional or check valves can be used to allow fluid to flow in one direction while preventing fluid flow in an opposite direction. Fluid may alternatively or additionally flow back and forth between the compression 20 and rebound 22 chambers via disc valves (not shown) through the piston 24 as known in the art. The operation of such passageways, check valves and disc valves is well known and will not be discussed in further detail.

The damping force of the shock absorber 10 is selectively adjusted by the control of bypass fluid flow (illustrated schematically by arrow B) through ports 36 and passageway 38 as actuated by a vehicle operator. It is desirable to control damping force to provide improved vehicle control and handling to accommodate vehicle payload changes or ground condition changes. For example, one vehicle application in which shock absorber damping adjustment is desirable is for snowmobiles. Aggressive drivers may desire high damping forces while non-aggressive drivers desire lower damping forces. Or, if mote than one passenger is riding on the snowmobile it may be desirable to change the damping force to accommodate the additional weight.

Damping force adjustment is accomplished by selectively rotating the outer cylinder 32 with respect to the inner cylinder 34 to selectively align the passageway 38 with predetermined patterns of ports 36. The rotation of the outer cylinder 32 is accomplished by any of various types of actuation methods. For example only, the outer cylinder 32 can be manually moved or moved through a gear box or the like (illustrated schematically at 45) by the operator or can be electrically moved upon selection of a desired damping position by the operator.

Figures 5A, 5B:
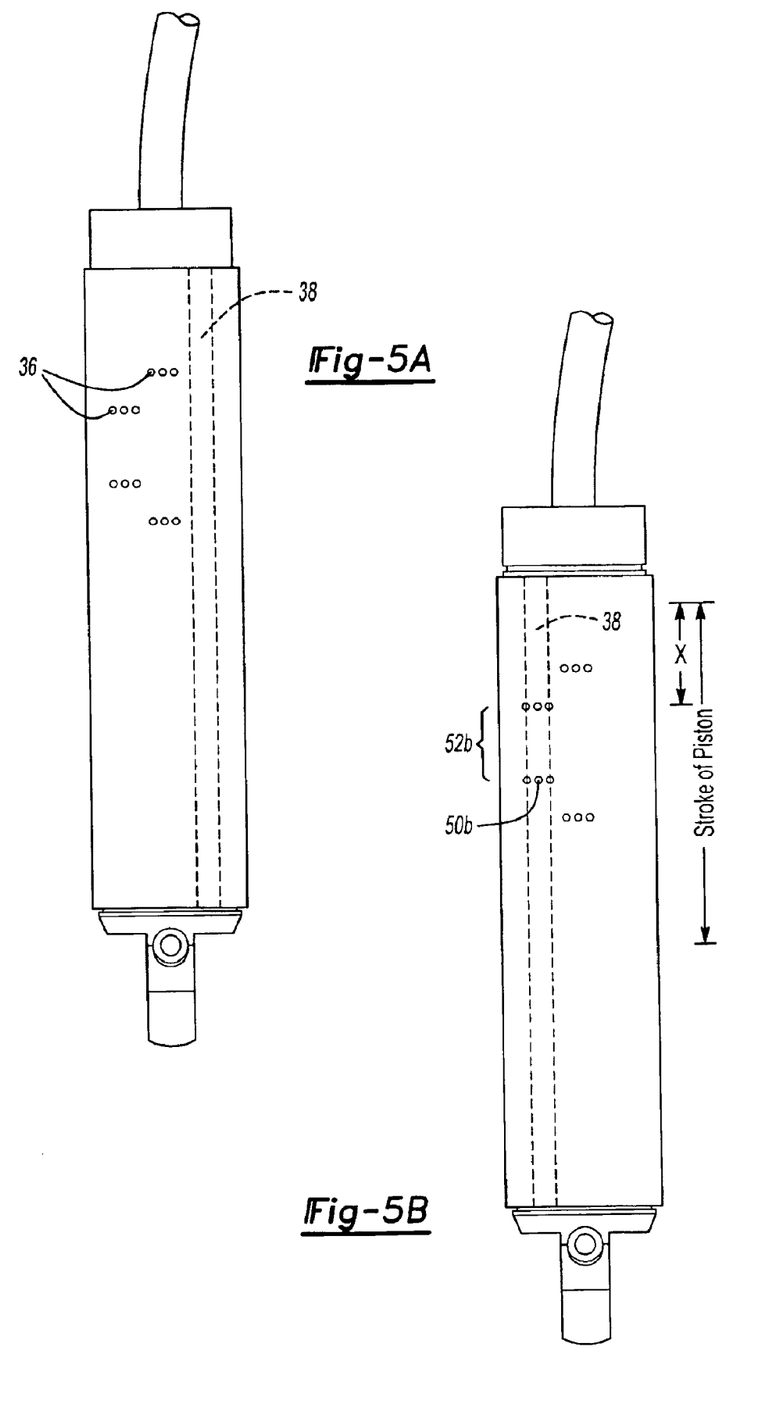
FIG. 5A is a general schematic view of the shock absorber in a first inactivated position.
FIG. 5B is a general schematic view of the shock absorber in a activated position.
Figure 6:
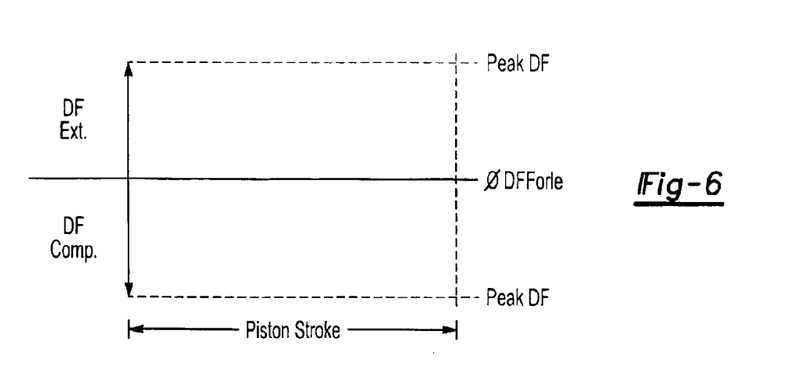
FIG. 6 is a graphical representation of the shock absorber damping force in the position illustrated in FIG. 5A.

Referring to FIG. 5A, when the passageway 38 is rotated out of alignment with all the ports 36, no adjustment to the dampening force results as the inner surface 46 of the outer cylinder seals the outer surface 48 of the inner cylinder 34. The shock absorber thereby performs in a conventional manner as illustrated by position A in the graph of FIG. 6. That is, the shock absorber 10 provides a predetermined peak damping force in compression and extension from the fluid flow through the piston only as there is no bypass fluid flow.

Figure 7:
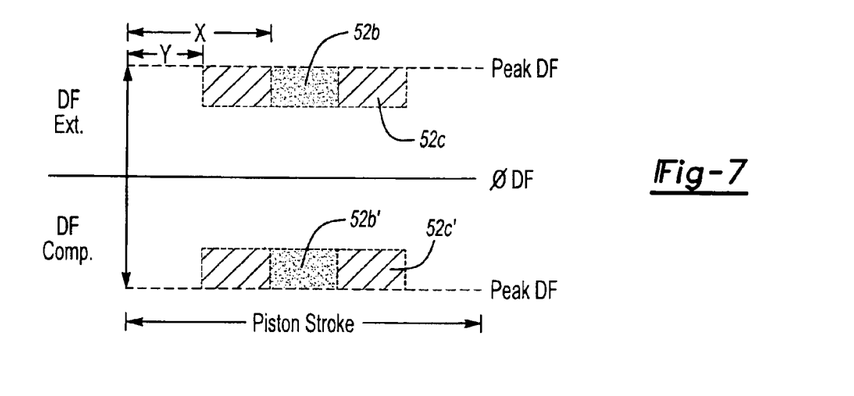
FIG. 7 is a graphical representation of the shock absorber damping force in the positions illustrated by FIGS. 5B and 5C.

Referring to FIG. 5B, when the passageway 38 is rotated to be aligned with a first pattern 50B of the ports 36, the peak damping force is reduced during a longitudinal portion 52B of the stroke. The shock absorber thereby performs in a conventional manner as illustrated by position A in the graph of FIG. 6 until the piston 24 (FIG. 4) becomes aligned with the first pattern 50B of the ports 36 at a distance X. Bypass fluid flow bypasses the piston 24 during the longitudinal portion 52B of the stroke and damping force is reduced from the peak damping force during both extension and compression as illustrated by bypass zone 52B in the graph of FIG. 7.

By locating a check valve 54 (FIG. 2) within the passageway 38 bypass fluid flow will only occur in one direction. That is, the damping force will be reduced from the peak damping force only during extension or compression (as illustrated in phantom at either 52B or 52B' in FIG. 7. It should also be understood that multiple passageways having check valves which operate in opposite fluid flow directions provide for the selection of damping in either extension or compression utilizing the same ports 36 through alignment of the appropriate passageway. Moreover, the check valve may be located at predetermined longitudinal locations to effect particular port patterns. One of reasonable skill in the art will readily determine various bypass arrangements through the teachings of the present invention.

Figures 5C, 5D:
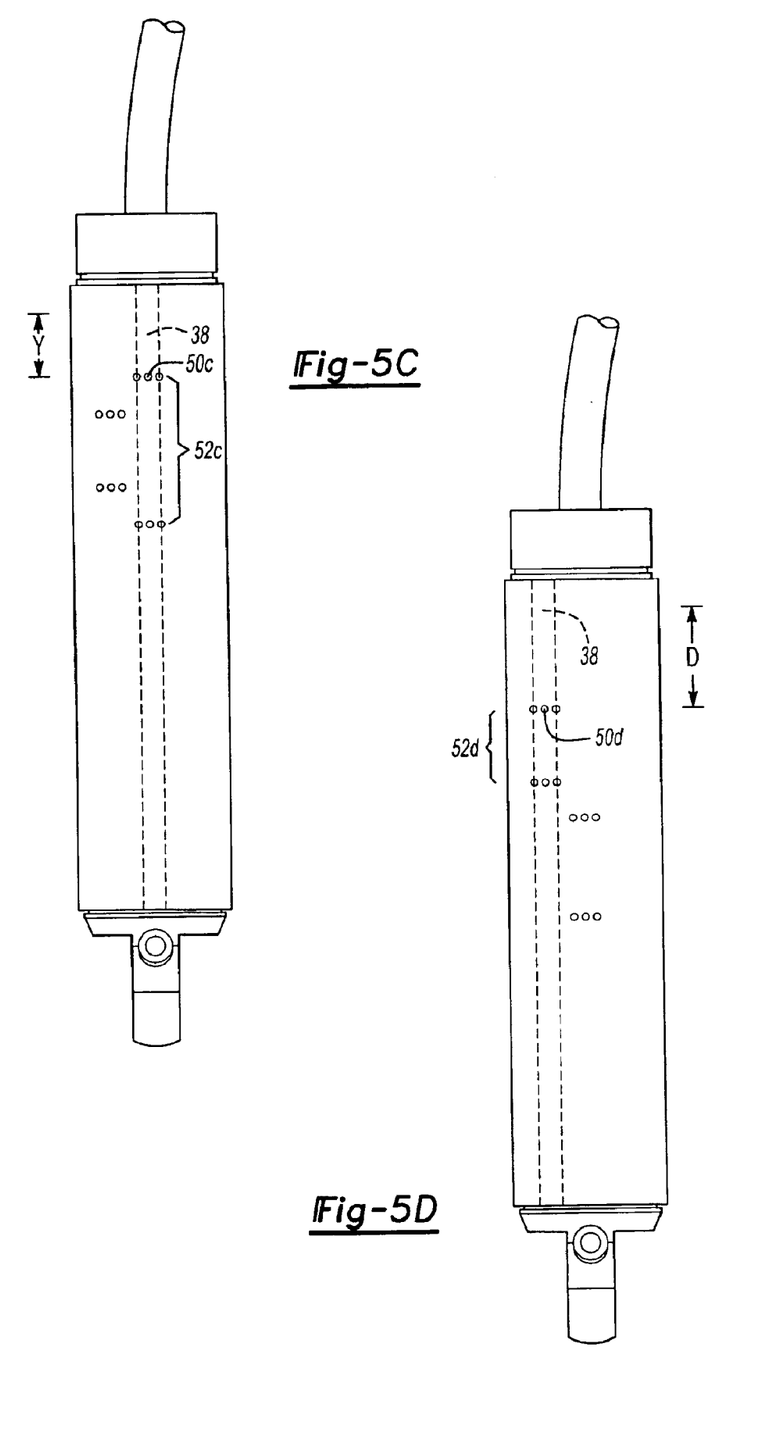
FIG. 5C is a general schematic view of the shock absorber in another activated position.
FIG. 5D is a general schematic view of the shock absorber in another activated position.

Referring to FIG. 5C, when the passageway 38 is rotated to be aligned with a second pattern 50C of the ports 36, the peak damping force is reduced during a longitudinal bypass zone 52C of the stroke. The shock absorber thereby performs in a conventional manner as illustrated position A in the graph of FIG. 7 until the piston 24 (FIG. 4) becomes aligned with the second pattern 50C of the ports 36 at a distance Y. Bypass fluid flow bypasses the piston 24 during the longitudinal bypass zone 52C of the stroke and damping force is reduced from the peak damping force as illustrated by bypass zone 52C in the graph of FIG. 7. Notably, the second pattern 50C of the ports 36 provides the same reduction in damping force but for a longer a longitudinal bypass zone 52C of the piston stroke.

Figures 5E, 5F:
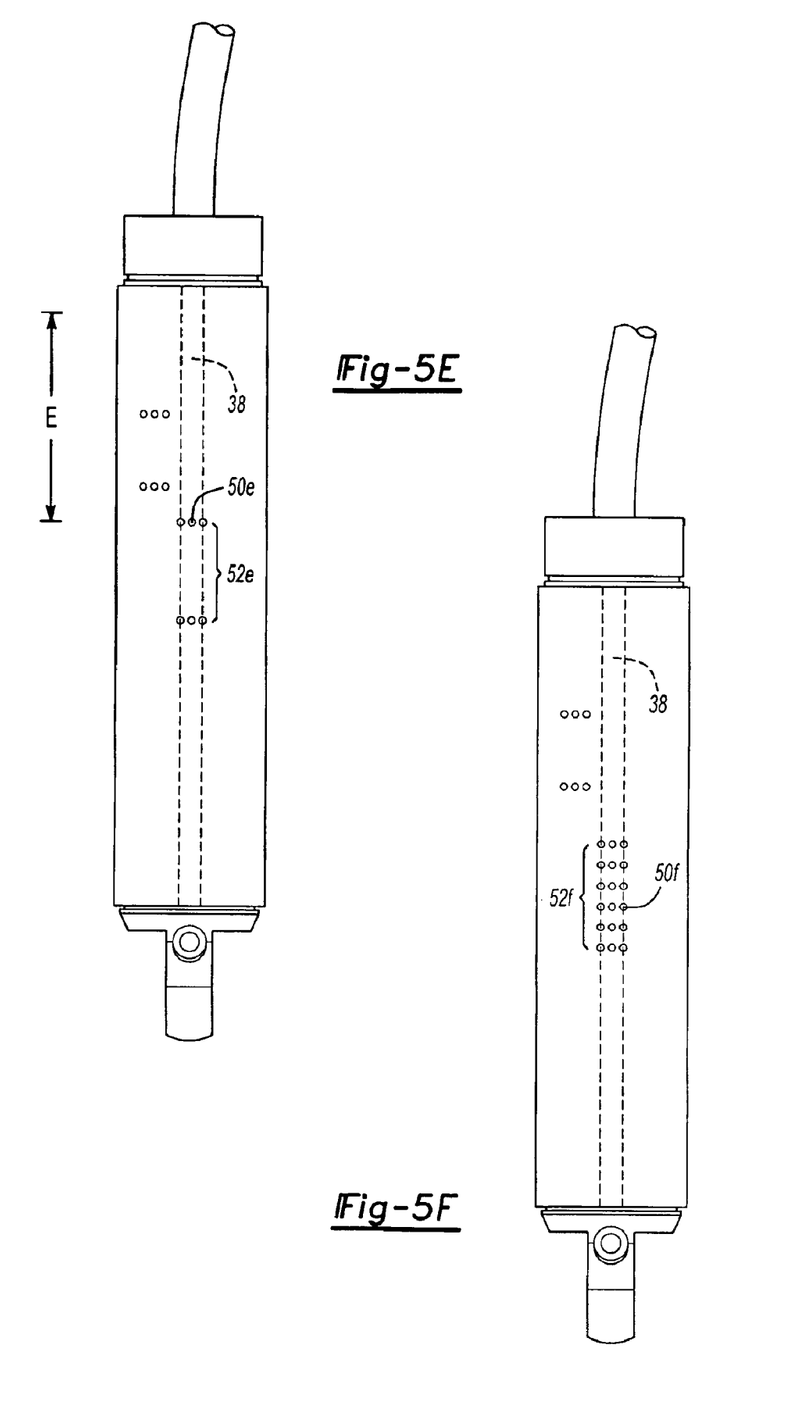
FIG. 5E is a general schematic view of the shock absorber in another activated position.
FIG. 5F is a general schematic view of the shock absorber in another activated position.
Figure 8:
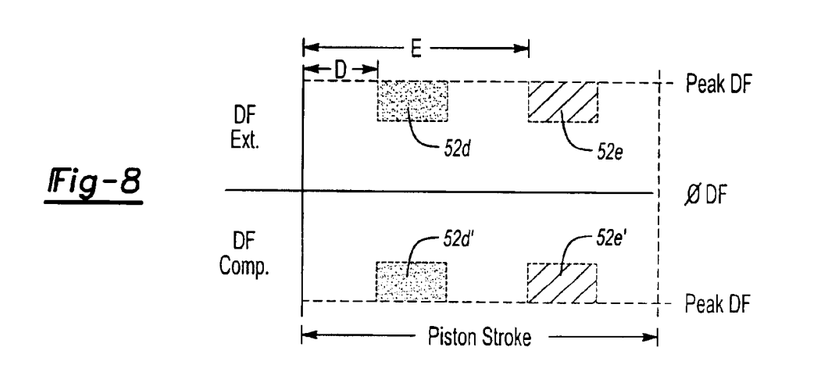
FIG. 8 is a graphical representation of the shock absorber damping force in the positions illustrated by FIGS. 5D and 5E.

Referring to FIGS. 5D and 5E, when the passageway 38 is rotated to be aligned with a third or fourth pattern 50D, 50E of the ports 36, the peak damping force is reduced during a particular longitudinal bypass zone 52D, 52E of the piston stroke. The shock absorber 10 thereby performs in a conventional manner as illustrated position A in the graph of FIG. 6 until the piston 24 (FIG. 4) becomes aligned with the appropriate pattern 50D, 50E of the ports 36. Bypass fluid flow bypasses the piston 24 during the longitudinal bypass zone 52D, 52E of the stroke and damping force is reduced from the peak damping force as illustrated by positions D and E in the graph of FIG. 8. Notably, the third and fourth pattern 50D, 50E of the ports 36 provides the same reduction in damping force, for the same stroke distance, but at different longitudinal distance D and E of the piston stroke.

Figure 9:
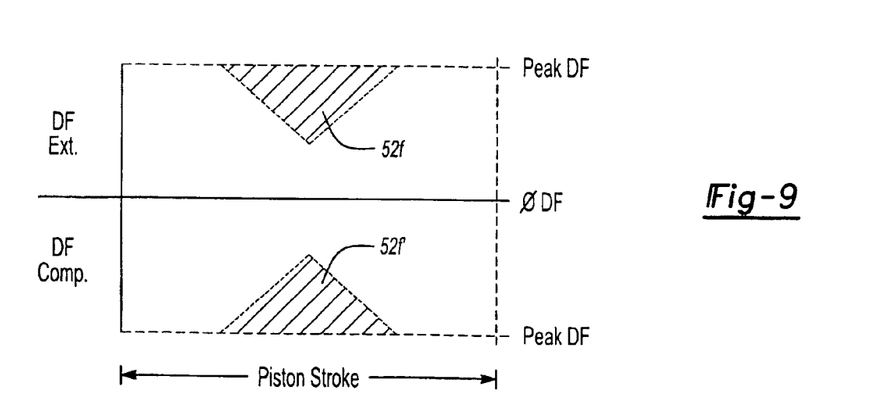
FIG. 9 is a graphical representation of the shock absorber damping force in the positions illustrated by FIG. 5F.

Referring to FIG. 5F, when the passageway 38 is rotated to be aligned with a fifth pattern 50F of the ports 36, the peak damping force is reduced during a particular longitudinal portion 52F of the stroke. As a relatively large number of ports 36 are provide in the fifth pattern 52F, which provides a progressive V-like reduction in damping force as illustrated by bypass zone 52F in the graph of FIG. 9. It should be understood that various port patterns and combinations thereof will benefit from the present invention. It should be understood that numerous port patterns and combinations thereof will benefit from the present invention.

Figure 10:
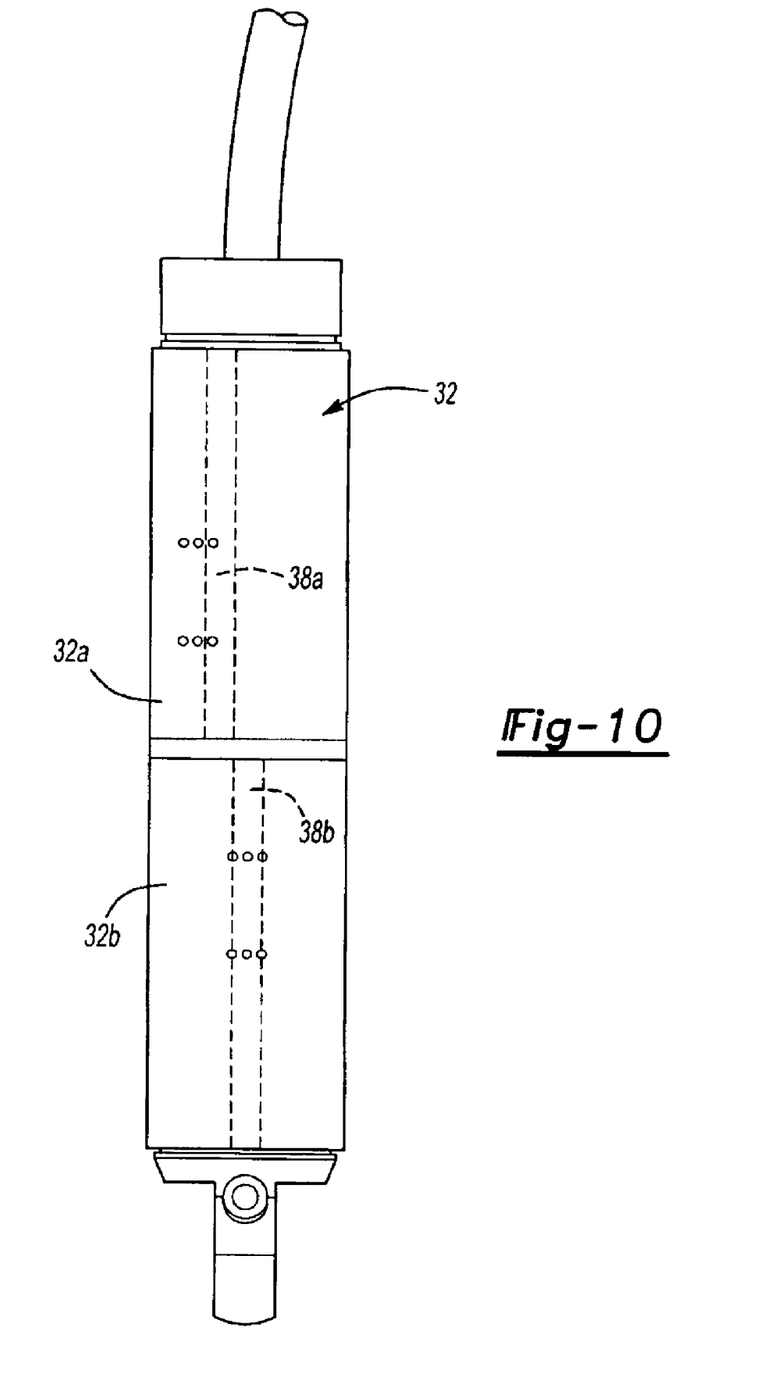
FIG. 10 is a general schematic view of another monotube shock absorber designed according to the present invention.

Referring to FIG. 10, the outer cylinder 32 is divided into two separate outer cylinder portions 32a, 32b which may be independently rotated. Each outer portion includes one or more passageways 38a, 38b such that the shock absorber 10' will operate as a series of independently adjustable shock absorbers. That is, the bypass fluid flow is separately adjustable for each portion 32a, 32b.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A shock absorber comprising:
   an inner cylinder which defines a longitudinal axis, said inner cylinder comprising a first pattern of ports circumferential displaced from a second pattern of ports, said first pattern of ports comprising a first set of ports longitudinally displaced a first distance from a second set of ports, said second pattern of ports comprising a third set of ports longitudinally displaced a second distance from a fourth set of ports;
   an outer cylinder comprising a longitudinal slot within an inner surface of said outer cylinder, said outer cylinder rotatably mounted to said inner cylinder such that said longitudinal slot selectively provides fluid communication between either said first pattern of ports or said second pattern of ports; and
   a one-way check valve located within said longitudinal slot, said one-way check valve longitudinally located between said first set of ports and said second set of ports to control a fluid communication flow direction between said first set of ports and said second set of ports.

2. The shock absorber as recited in claim 1, further comprising a fluid seal between said inner cylinder and said outer cylinder.

3. The shock absorber as recited in claim 1, wherein said first distance is different than said second distance.

4. The shock absorber as recited in claim 1, further comprising an actuator to rotate said outer cylinder relative to said inner cylinder.

5. The shock absorber as recited in claim 1, wherein said one-way check valve is located within said longitudinal slot and rotates with said outer cylinder.

6. The shock absorber as recited in claim 5, wherein said one-way check valve is located intermediate ends of said longitudinal slot.

7. A shock absorber comprising:
   an inner cylinder which defines a longitudinal axis, said inner cylinder comprising a first pattern of ports circumferential displaced from a second pattern of ports, said first pattern of ports comprising a first set of ports longitudinally displaced a first distance from a second set of ports, said second pattern of ports comprising a third set of ports longitudinally displaced a second distance from a fourth set of ports, a third pattern of ports circumferential displaced from a fourth pattern of ports, said third pattern of ports comprising a fifth set of ports longitudinally displaced a third distance from a sixth set of ports, said fourth pattern of ports comprising a seventh set of ports longitudinally displaced an fourth distance from an eighth set of ports;
   a first outer cylinder comprising a first longitudinal slot within an inner surface of said first outer cylinder, said first outer cylinder rotatably mounted to said inner cylinder such that said longitudinal slot selectively provides fluid communication between either said first pattern of ports or said second pattern of ports when aligned therewith;
   a first one-way check valve located within said first longitudinal slot, said one-way check valve located longitudinally between said first set of ports and said second set of ports to control a fluid communication flow direction between said first set of ports and said second set of ports;
   a second outer cylinder longitudinally adjacent and independently rotatable relative said first outer cylinder, said second outer cylinder comprising a second longitudinal slot within an inner surface of said second outer cylinder within an inner surface of said second outer cylinder, said second outer cylinder rotatably mounted to said inner cylinder such that said second longitudinal slot selectively provides fluid communication between either said third pattern of ports or said fourth pattern of ports when aligned therewith;
   a second one-way check valve located within said second longitudinal slot said second one-way check valve located longitudinally between said fifth set of ports and said sixth set of ports to control a fluid communication flow direction between said fifth set of ports and said sixth set of ports.

8. The shock absorber as recited in claim 7, further comprising a first actuator to rotate said first outer cylinder relative to said inner cylinder and a second actuator to rotate said second outer cylinder relative to said inner cylinder.

9. The shock absorber as in claim 7, wherein said first one-way check valve is located within said first longitudinal slot and rotates with said first outer cylinder and said second one-way check valve is located within said second longitudinal slot and rotates with said second outer cylinder.

10. The shock absorber as recited in claim 9, wherein said first one-way check valve is located intermediate ends of said first longitudinal slot, and said second one-way check valve is located intermediate ends of said second longitudinal slot.

11. A method for adjusting a damping force in a shock absorber comprising the steps of:
  (1) rotationally mounting a first cylinder comprising a plurality of ports within a second cylinder having a longitudinal passageway within an inner wall;
  (2) mounting a piston within the first cylinder for damping vibrations as the piston moves in a first direction and a second direction; and
  (3) rotating the second cylinder with respect to the first cylinder to selectively align the longitudinal passageway with at least two of said plurality of ports to selectively decrease the damping force at a predetermined longitudinal distance along a stroke of the piston from a peak damping force in response to the piston moving between the at least two of said plurality of ports, the predetermined longitudinal distance being at an intermediate location along the stroke of the piston and the decrease in damping force occurring only in the first direction.

12. A shock absorber comprising:
  an inner cylinder which defines a longitudinal axis, said inner cylinder comprising a first pattern of ports circumferential displaced from a second pattern of ports, said first pattern of ports comprising a first set of ports longitudinally displaced a first distance from a second set of ports, said second pattern of ports comprising a third set of ports longitudinally displaced a second distance from a fourth set of ports;
  an outer cylinder comprising a longitudinal slot within an inner surface of said outer cylinder, said outer cylinder rotatably mounted to said inner cylinder such that said longitudinal slot selectively provides fluid communication between either said first pattern of ports or said second pattern of ports; and
  an actuator to selectively rotate said outer cylinder relative to said inner cylinder to position said longitudinal slot between either said first pattern of ports or said second pattern of ports to selectively provide fluid communication between either said first pattern of ports or said second pattern of ports in response to a desired damping force.

13. The shock absorber as recited in claim 12, wherein said actuator includes a gearbox.

14. The shock absorber as recited in claim 12, wherein said actuator is remotely operable by a vehicle operator.

15. The shock absorber as recited in claim 12, further comprising a one-way check valve located within said longitudinal slot, said one-way check valve located longitudinally between said first set of ports and said second set of ports to control a fluid communication flow direction between said first set of ports and said second set of ports.

* * * * *